United States Patent

[11] 3,588,033

| [72] | Inventor | Kaiji Negoro<br>Montebello, Calif. |
|---|---|---|
| [21] | Appl. No. | 754,753 |
| [22] | Filed | Aug. 16, 1968 |
| [45] | Patented | June 28, 1971 |
| [73] | Assignee | Whittaker Corporation<br>Los Angeles, Calif. |

[54] TRACER CONTROL MECHANISM
7 Claims, 12 Drawing Figs.

[52] U.S. Cl..................................................... 251/3,
 90/62, 91/413, 137/636.4, 137/596
[51] Int. Cl....................................................... B23q 35/18
[50] Field of Search............................................ 90/62;
 251/3; 60/97 (T); 91/413; 137/636.4

[56] References Cited
UNITED STATES PATENTS

| 2,387,007 | 10/1945 | Buchanan...................... | 137/636.1 |
| 2,730,129 | 1/1956 | Dall et al. ...................... | 137/636.4X |
| 2,935,289 | 5/1960 | Chiappulini.................. | 251/3 |
| 3,216,448 | 11/1965 | Stacy............................. | 137/636.1X |

Primary Examiner—Gil Weidenfeld
Attorney—Jessup and Beecher

ABSTRACT: A tracer control mechanism which is intended to be used in conjunction with an hydraulically operated machine tool, such as a milling cutter tool, or other type of cutter or shaper, and by which the tracer mechanism hydraulically controls the movement of the machine tool, is described. The disclosure is particularly concerned with an improved speed control for such a tracer mechanism.

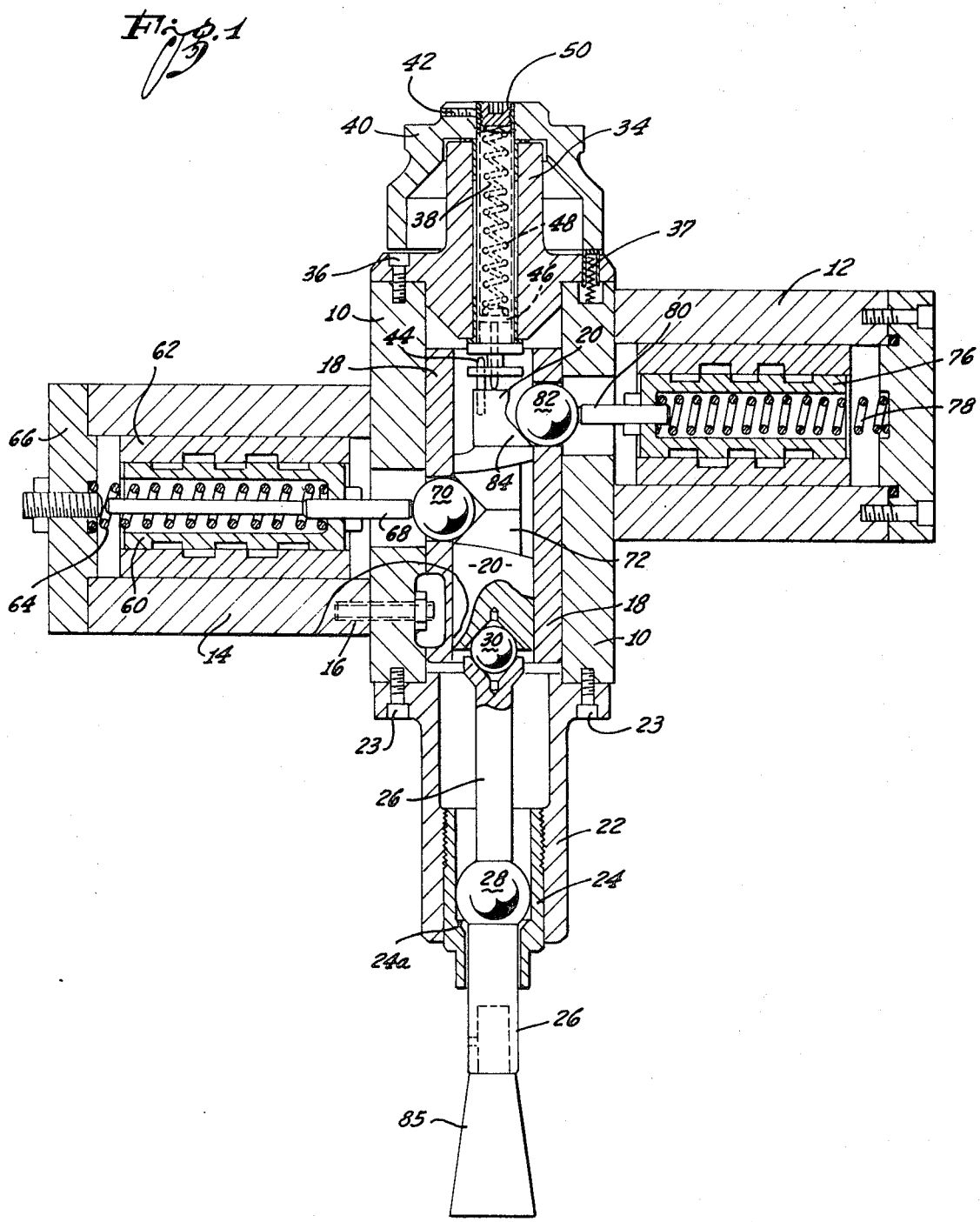

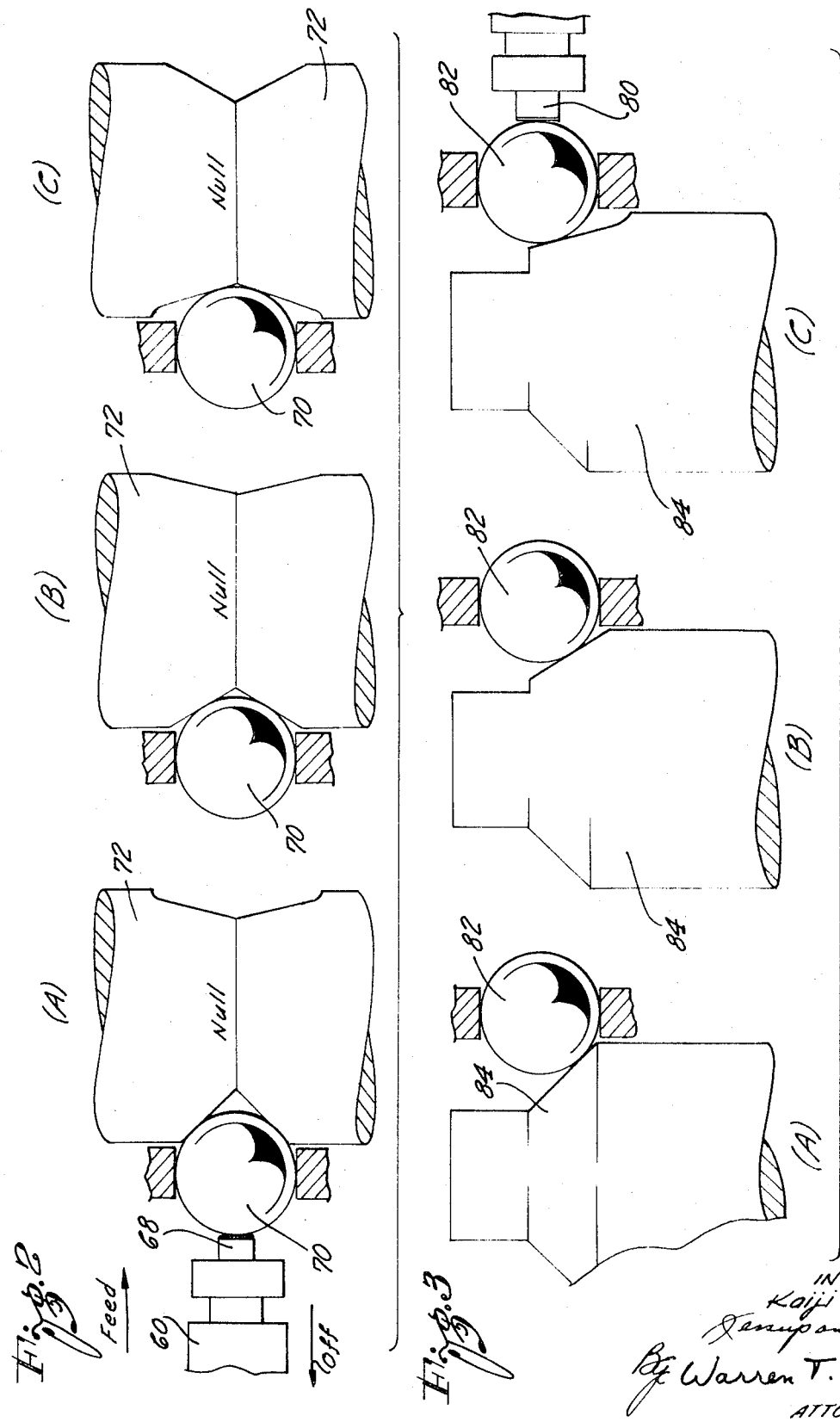

INVENTOR:
Kaiji Negoro
Penny and Cecher
By Warren T. Jessup
ATTORNEYS

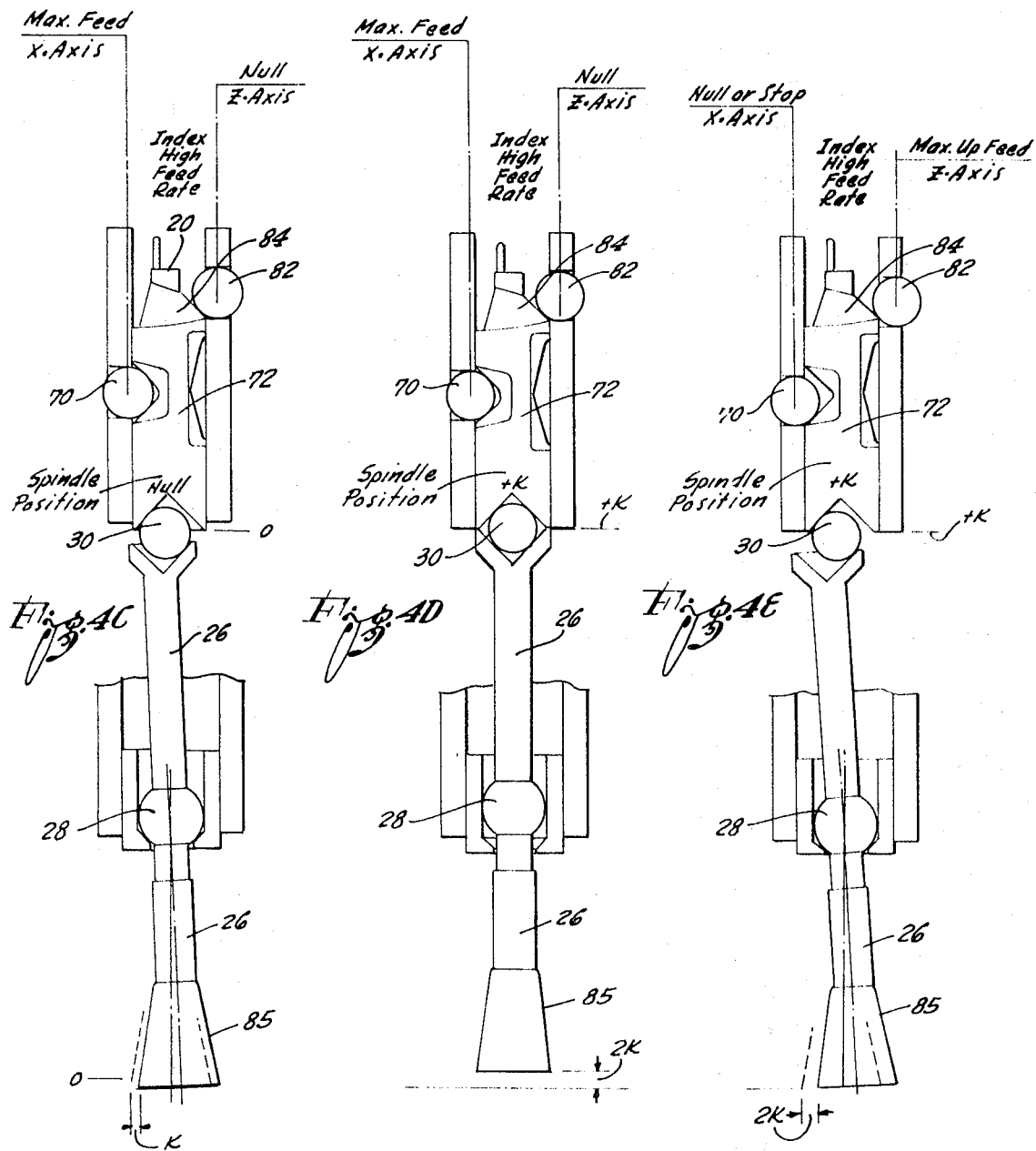

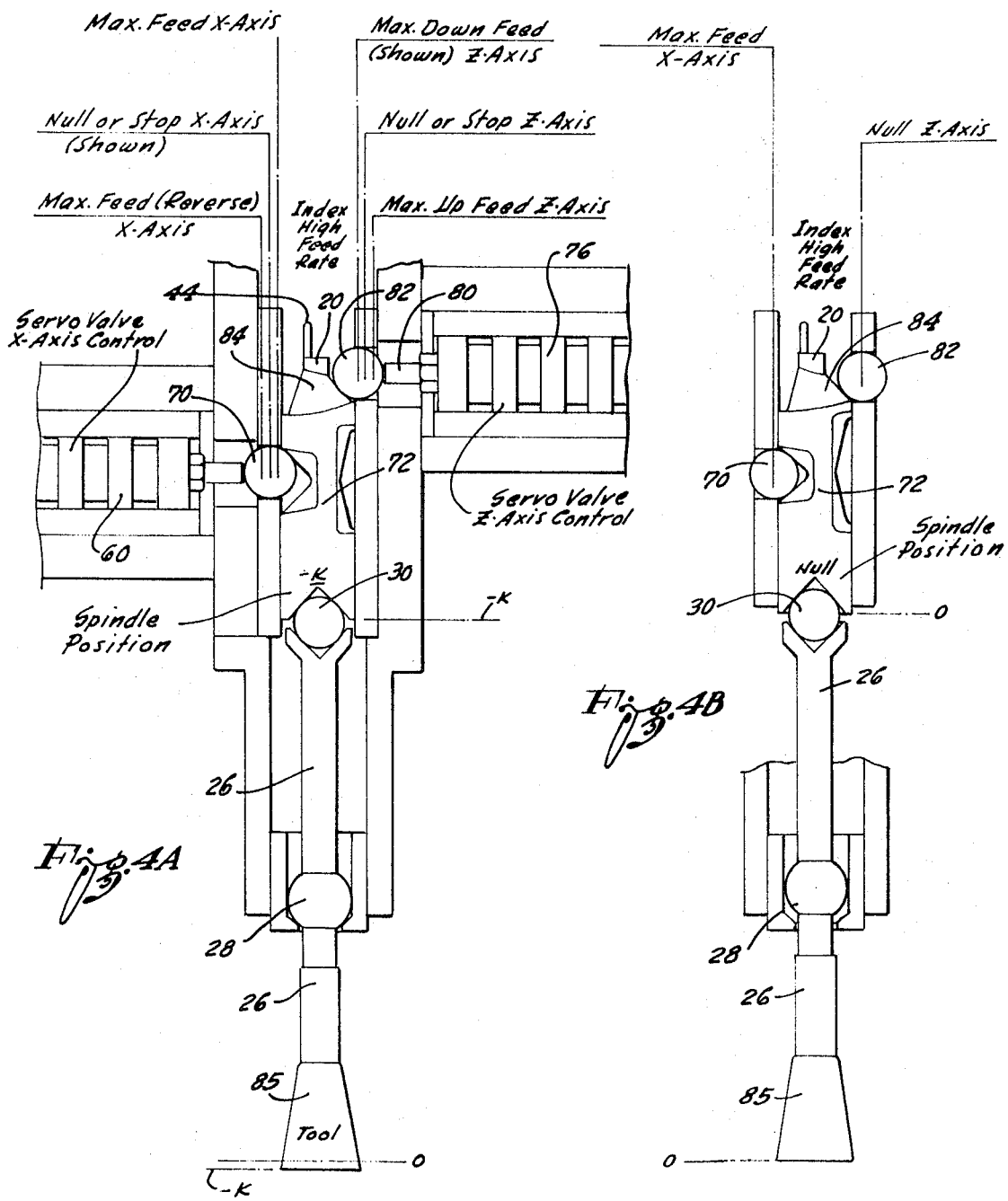

TRACER CONTROL MECHANISM

BACKGROUND OF THE INVENTION

Tracer control mechanisms are generally well known, and these usually include a pivotally mounted stylus, which is intended to be moved along the contours of a template and which thereby causes the controlled machine tool to duplicate the pattern represented by the template. Such tracer control mechanisms are also known in which the stylus is vertically movable to respond to "Z-axis" variations of the template.

In the particular tracer control mechanism with which the present invention is concerned, the template and workpiece are both mounted on a common work table, and the work table is moved in a direction such that the stylus of the tracer control mechanism moves across the surface of the template. The movement of the stylus across the template is along, for example, the X-axis, as the operative element of the machine tool is moved along the corresponding axis of the workpiece. Then, when the stylus meets a depression, for example, in the template, it moves down into the depression. This action of the stylus in the mechanism of the invention automatically causes the rate of movement of the work table in the X-axis direction to be reduced, and the action also sets up a Z-axis movement in the operative element of the machine tool with respect to the workpiece.

Likewise, when the stylus meets a protuberance in the surface of the template, it tilts and then moves vertically in a direction to cause the Z-axis control of the operative element of the machine tool to move the element in an upward vertical direction with respect to the workpiece, and, again, the speed of the X-axis movement is automatically reduced.

In the control mechanisms of the general type under consideration, the stylus has a predetermined diameter, so that its leading edge will meet the protuberances in the template with a certain lead displacement with respect to the controlled action of the tool itself, so as to compensate for the control motion required by the stylus.

A feature of the tracer control mechanism of the present invention is the inclusion of an X-axis speed control which may be adjusted by the operator. This permits the operator to set his machine for high-speed operation when only shallow depressions and small protuberances are to be encountered on a particular template; and to slow down the speed of his machine when deep depressions and large protuberances of the template establish a substantial cutting action by the controlled tool, so that the maximum power capabilities of the tool will not be exceeded.

However, in a typical Z-axis tracing machine, different leads are required for the different speeds, and it is not feasible to replace the stylus with a stylus of a different diameter, each time a speed change is made. This requirement is obviated in the improved mechanism of the present invention. In the tracer control mechanism to be described, a manual adjustment is provided for setting the "X-axis" feed speed, to any selected value. The mechanism is constructed, as will be described, so that any such setting of the X-axis speed automatically produces a corresponding adjustment in the rate of response by the Z-axis control.

The control mechanism of the invention is conceived and constructed so that regardless of the setting of the X-axis speed by the aforesaid control, a predetermined movement of the stylus will displace the X-axis control to a minimum speed position. Therefore, a predetermined control movement of the stylus by the template will always reduce the speed of the machine to a minimum, as is required, regardless of the speed setting of the mechanism.

Moreover, the Z-axis control is conceived and constructed so that at the "null" reference position of the stylus, the Z-axis control will be in its "null" position, regardless of the setting of the speed control. This, obviously, is a criterion for proper operation of the mechanism, since regardless of the setting of the X-axis speed, no Z-axis movement must occur when the stylus is held at its "null" position by the template.

SUMMARY OF THE INVENTION

A tracer control mechanism is provided in which a stylus is driven across a template at a preset rate, and in which the stylus responds to variations in the template to control a machine tool. The stylus is coupled to a spindle in the control mechanism which, in turn, has a pair of spaced cam surfaces. The cam surfaces control respective hydraulic valves, so that the feed rate of the workpiece, for example, may be automatically reduced towards zero when the stylus initiates a particular cutting action by the tool. The tracer control mechanism includes an adjustable speed setting which is achieved by turning the spindle. The cam surfaces are shaped so that the proper response is automatically provided for any selected feed rate.

BRIEF DESCRIPTION OF THE DRAWINGS

FIG. 1 is a side sectional view of one embodiment of the tracer control mechanism of the present invention;

FIG. 2 is a series of schematic representations showing various feed rate controls which may be effectuated by adjustment of the mechanism of FIG. 1;

FIG. 3 is a series of schematic representations showing corresponding response rate controls which are automatically established in the tracer control mechanism in correspondence with the various settings of FIG. 2; and FIGS. 4a—4i are schematic representations of the tracer control mechanism in various operating positions.

DESCRIPTION OF THE PREFERRED EMBODIMENT

Figure 4F:
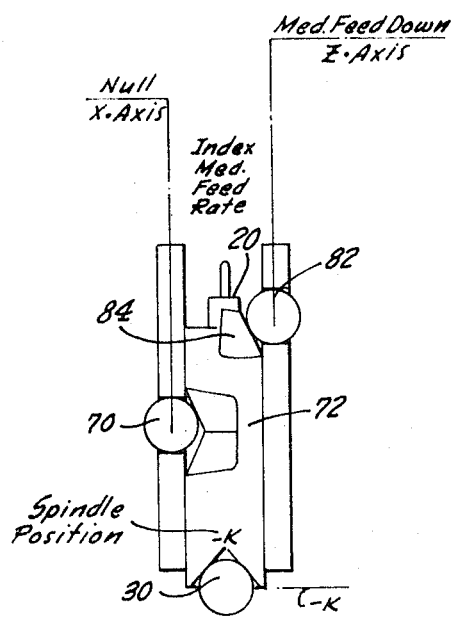
Figure 4G:
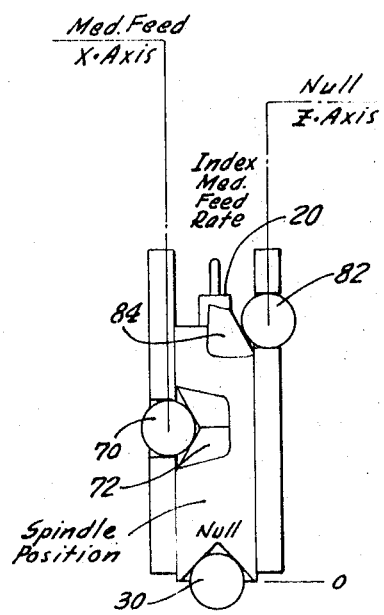
Figure 4H:
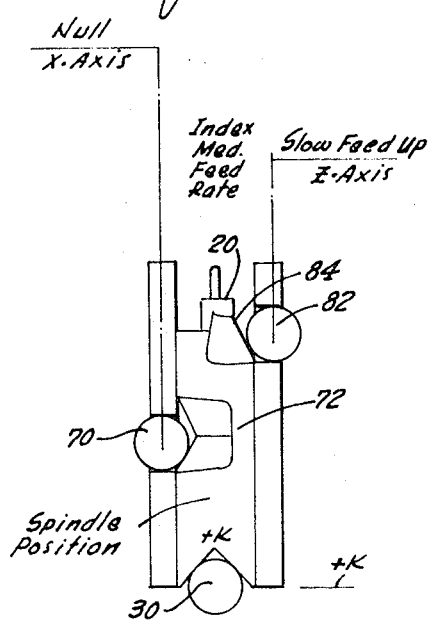

The tracer control mechanism of the invention, insofar as the embodiment of FIG. 1 is concerned, includes a tubular housing 10. A first hydraulic servocontrol valve assembly 12 is mounted on the housing 10 and extends radially outwardly from the housing. A second hydraulic control valve assembly 14 is mounted on the housing 10, and, likewise, extends radially outwardly from the housing. The control valve assemblies 12 and 14 may be mounted on the housing 10 by means, for example, of threaded fasteners 16.

The housing 10 includes an inner sleeve 18 which is mounted within the housing and which constitutes, for example, a bearing surface for a spindle 20 which is slidable within the sleeve for rectilinear reciprocal movement therein, and which is also rotatable within the sleeve. A tubular end portion 22 is affixed, for example, to the lower end of the housing 10 in coaxial relationship therewith, and it is attached to the end of the housing 10 by means, for example, of screws such as the screws 23.

A lower sleeve 24 is threaded into the end of the member 22, and an elongated spindle 26 is pivotally mounted within the sleeve 24 by means of an integral ball 28. As shown, the spindle 26 protrudes from the lower end of the sleeve 24. The lower extremity of the spindle 26 carried a stylus tip 85 which has a substantial diameter, so as to provide a "lead" over the corresponding cutter diameter for the reasons explained above. The sleeve 24 provides a seat 24a for the ball 28, and permits not only pivotal movement of the spindle 26, but also reciprocal linear movement of the stylus with respect to the housing 10 and tubular end portion 22. The spindle 26 is coupled to the spindle 20 by means, for example, of a ball 30 which fits into a conical cavity in the lower end of the spindle and into a corresponding cavity in the upper end of the spindle 26.

The maximum diameter of the stylus tip 85 corresponds to that of the controlled cutter tool diameter plus 2K, where K represents the "lead." This lead is the input necessary to drive the X-axis spool 60 (to be described) from no feed (zero speed) when the spindle 26 is at its maximum Z displacement, to the preset X speed when the spindle 26 is at its null Z displacement.

An upper head member 34 is mounted on the housing 10 by means, for example, of screws 36. The head member 34 has a central aperture which is axially aligned with the longitudinal axis of the spindle 20. A tubular control shaft 38 extends through the central aperture in the head 34, and a control knob 40 is affixed to the shaft 38 by means, for example, of a setscrew 42.

An offcenter pin 44 couples the lower end of the shaft 38 to the spindle 20, so that rotation of the shaft 38 by the manual turning of the control knob 40 produces a corresponding rotation of the spindle 20 within the sleeve 18 of the housing 10. A plunger 46 is positioned in the tubular shaft 38, and the plunger has a protruding end which bears against the upper end of the spindle 20. A spring 48 within the tubular shaft 38 biases the plunger against the spindle. A setscrew 50 holds the spring 48 within the tubular shaft.

It will be appreciated, therefore, that the spring-biased plunger 46 urges the spindle 20 towards the opposite end of the sleeve 18 which, in turn, urges the stylus tip 85 on the end of the spindle 26 down against the surface of the template (not shown) which is engaged by the lower end of the stylus tip. The template normally displaces the spindle 26 upwardly in the housing 10, so that its ball 28 is normally spaced from the seat 24a defined by the sleeve 24. This constitutes the "null" position of the spindle 26 and of the spindle 20. It will be understood that when the stylus tip 85 on the spindle 26 engages a depression in the upper surface of the template, the spring 48 will bias the stylus tip down into the depression, with the ball 28 moving towards its seat 24a. This downward movement of the spindle 26, of course, is accompanied by a corresponding downward movement of the spindle 20.

Conversely, when the stylus tip 85 on the spindle 26 meets a protuberance in the surface of the template, it first tilts, as its leading edge meets the edge of the protuberance, and such tilting produces an upward movement of the spindle 20 within the sleeve 18, due to the coupling between the stylus 26 and the spindle through the ball 30. Also, any upward movement of the spindle 26 as the stylus tip 85 moves up over the protuberance produces a corresponding displacement of its ball 28 from the seat 24a and corresponding linear movement of the spindle 20 upwardly in the housing 10.

The control valve 14 may be considered the X-axis feed control for the mechanism, and it includes a spool 60 which is movable in the valve housing 62. The spool is biased, for example, by a spring 64 which bears against the cover 66 of the housing, so that the end of a central pin 68, which is affixed to the spool, engages a ball 70. The ball 70 is supported in an opening in the side of the sleeve 18, and it engages a first cam member 72 on the spindle 20 as a cam follower.

As mentioned above, the lower end of the stylus tip 85, during normal operation of the system, moves across a template (not shown). The template, together with the workpiece, may be supported on a work table. The template normally holds the spindle 26 in its "null" position, with its ball 28 up off the seat 24a, as explained above. For this "null" position of the spindle 26, the spindle 20 is positioned in the sleeve 18, so that the cam 72 allows the ball 70 to move the spool 60 to the rightmost in FIG. 1 limited by the cam 72, as shown. This setting of the valve assembly 14 causes the work table to move at a predetermined feed rate, moving the workpiece under the cutting element of the controlled tool, and moving the template under the spindle 26. During this "null" position of the spindle 26, and of the spindle 20, the spool 76 of the Z-axis valve assembly 12 is held at its "null" position, so that there is no Z-axis movement imparted to the controlled tool.

Now, should the stylus tip 85 on the spindle 26 encounter a depression in the template, the resulting downward movement of the spindle 26 and of the spindle 20 causes the Z-axis valve spool 76 to move to the left in FIG. 1, so as to impart the desired movement to the controlled tool. At the same time, the resulting movement of the spindle 26 and of the spindle 20, causes the X-axis valve spool 60 to move to the left in FIG. 1 so as to reduce the feed X-axis rate towards zero while the Z-axis action is taking place.

Conversely, should the stylus tip 85 on the spindle 26 encounter a protuberance in the template, the initial tilting action of the spindle 26 produces an upwardly movement of the spindle 20 which causes the Z-axis valve assembly spool 76 to move in the opposite direction, so that an oppositely controlled movement is imparted to the controlled tool. At the same time, the X-axis spool 60 is again moved to the left in FIG. 1, to reduce the feed rate towards zero.

As mentioned above, when the tracer control mechanism of FIG. 1 is to be used in conjunction with a template, in which there are shallow depressions and small protuberances, it is desirable for the speed at which the operation proceeds to be set at a relatively high level so that the job may proceed at an optimum rate. However, where the depressions are deep, and where the protuberances are substantial, the speed of the operation should proceed at a relatively slow rate, so that the power capabilities of the controlled tool will not be exceeded.

As mentioned above, the thickness of the stylus tip 85 on the end of the spindle 26 provides a predetermined lead in the equipment. However, for the different speeds, it is obvious that different leads will be required. It is also obvious that it is not convenient to provide a different stylus tip for each speed setting. In the mechanism of FIG. 1, different responses of the Z-axis control are provided for each speed setting in the X-axis feed rate control, so that there is no need to provide for a different stylus for each different feed rate setting.

For example, and as shown in FIG. 2, the cam member 72 is shaped so that it has a normal notched configuration, with the angle of the notch varying from a minimum value, as shown as (A) in FIG. 2, to a maximum value as shown as (C) in FIG. 2. Therefore, as the spindle 20 is turned by turning the knob 40, and for the null normal linear position of the spindle 20, the ball 70 is moved from a maximum position to the right in FIG. 1, corresponding to the setting shown at (A) in FIG. 2, to a minimum position to the right in FIG. 1, as shown by the setting (C) of FIG. 2.

For the aforesaid "null" position of the spindle 26 at which, as explained above, the ball 28 is disposed slightly up from the seat 24a, the spindle 20 may be rotated to provide any desired X-axis feed speed, as established by the cam member 72. However, the cam member 72 is shaped so that a predetermined speed is established by the angular setting of the spindle 20 when the stylus is in the aforesaid "null" position, the axial displacement of the spool 60 to its "off" position, will be made, as the spindle 20 is moved to its maximum position in either direction. This, as pointed out, is necessary, so that the X-axis speed may be reduced to zero for a predetermined movement of the spindle 26, either up or down, and regardless of the speed of the X-axis control, as established by the preset angular position of the spindle.

Likewise, and as shown, for example, in FIG. 3, the cam member 84 is shaped so that each angular setting of the spindle 20 will provide a corresponding rate of response by the Z-axis valve assembly 12. This, for example, means that for the higher X-axis feed speeds, a higher response is provided than for the lower X-axis feed speeds. This latter characteristic is achieved by shaping the cam 84 as shown, for example, in FIG. 3, with the representation (A) of FIG. 3 showing the maximum response by the Z-axis assembly, and corresponding to the maximum X-axis speed setting of (A) of FIG. 2. Likewise, (C) of FIG. 3 shows the minimum Z-axis response, and corresponds to the minimum speed setting of (C) of FIG. 2.

The cam 84 is also shaped so that when the spindle 26 and the spindle 20 are in their aforesaid "null" reference position, the ball 82 causes the spool 76 to assume a particular "null" position in the valve 12, and which position remains unchanged, regardless of the angular setting of the spindle 20. This, also, is necessary, since there must be no Z-axis movement, when the spindle 26 is in its normal reference position and regardless of the speed setting of the control mechanism. Thus, turning the dial 40 and thereby indexing the spindle 20, changes the shapes of the operating cams 72 and 84 relative to their corresponding balls 70 and 82, and thereby sets the feed rate (X-axis) by setting the spool 60, and also determines the rate of Z-axis response for the selected feed rate.

The operation of the tracer valve mechanism of the invention may be better understood by a consideration of the schematic views of FIGS. 4a—4i. It is to be understood that when the Z position of the spindle 20 is in the "up" position (+K) or in the "down" position (−K), as established either by a linear movement or tilt (or both) of the spindle 26, the X-axis feed is nulled, regardless of the slope of the cam 72 in contact with the ball 70. Likewise, whenever the Z position of the spindle 20 is in the "null" position, the Z-axis control speed is zero, regardless of what slope of the cam 84 is engaged by the ball 82.

In FIG. 4a, the spindle 26 is shown in its down Z position (−K), with the cam 72 indexed for high X-axis feed rate. In this position the cam 72 moves the ball 70 and spool 60 to a position in which the X feed rate is nulled. At the same time, the cam 84, which for this index position has a selected slope, biases the ball 82 and spool 76 for a correspondingly high "down" Z axis control speed for the controlled tool, corresponding to the high-speed setting of the cams.

In FIG. 4b, the spindle 20 is shown in its null position, due to a linear Z-axis shift of the spindle 26 from the position of FIG. 4a. The ball 70 and spool 60 are now moved by the cam 72 to a position at which the preset high X-axis feed speed may be resumed. The ball 82 and spool 76, on the other hand, are now moved by the cam 84 so that the high "down" Z-axis control speed is reduced to zero. In FIG. 4c, the same control as in FIG. 4b is achieved by a tilt of the spindle 26, rather than a linear shift.

In FIG. 4d, the spindle 20 and its cams are still indexed to the "high speed" angular position of FIGS. 4a—4c. Here, however, the spindle 20 is moved up to its (+K) Z-axis position by a corresponding linear shift of the spindle 26. Again the X-axis feed speed is reduced to zero, and a Z-axis "up" control speed is developed corresponding to the previously established X-axis feed speed. The same result is achieved by a tilt of the spindle 26, as shown in FIG. 4a.

In FIG. 4f, the spindle 20 is turned to index the cams 72 and 84 to a "medium" feed rate. Again, when the spindle 20 is in its down (−K) Z-axis position, the X-axis feed speed is nulled. Moreover, when the spindle 20 is moved back to its "null" position shown in FIG. 4g, either by a linear movement or by a tilt of the spindle 26, the X-axis feed speed returns to its preset medium rate. Likewise, when the X-axis feed speed was nulled, the Z-axis control rate is established at an intermediate speed corresponding to the feed speed; and when the feed speed was resumed, the Z-axis control is nulled.

Thus it will be appreciated that whenever the cams 72 and 84 are indexed to provide a particular X-axis feed speed, the Z-axis control rate is adjusted accordingly to match the feed speed. Also, the control is such that when there is a command for a Z-axis movement, up or down, of the controlled cutting tool, that movement will proceed at a rate determined by the X-axis feed speed, and the X-axis feed speed is nulled during the Z-axis movement of the cutting tool.

Figure 4I:
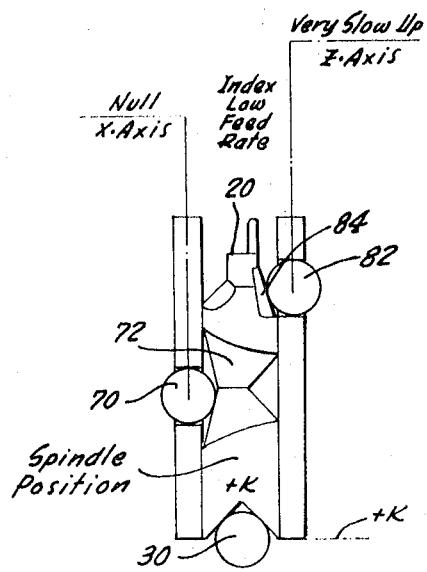

The indexing of the cams in FIG. 4i is for a "low feed" rate, as controlled by the ball 70 engaging the cam 72 at its shallowest point. The spindle 20 is shown as displaced to its up (+K) position, as in FIG. 4h. For the illustrated index position of FIG. 4i, the cam 84 moves the ball 82 to a low-speed Z control rate which matches the low feed rate setting.

The invention provides, therefore, an improved tracer valve assembly which may be controlled to be moved across a template at an adjustable predetermined speed; and which automatically responds to movements of the stylus to reduce the aforesaid speed towards zero and, simultaneously, to produce desired movements in the controlled cutting tool. An important feature of the tracer control valve of the invention is that the rate of response of the control of the cutting tool is automatically made a function of the preset controlled speed of the instrument.

While a particular embodiment of the invention has been shown and described, modifications may be made. It is intended in the claims to cover the modifications which come within the scope of the invention.

I claim:

1. A tracer control mechanism including:

a housing;

a spindle mounted in said housing for axial longitudinal reciprocal linear movement therein and for rotatable movement therein;

first and second cam members positioned on said spindle axially spaced from one another;

a stylus member mounted in said housing for pivotal and longitudinal reciprocal linear movement therein;

means coupling said stylus member to said spindle for producing linear movements of said spindle in each of two directions with respect to a predetermined null axial position in response to pivotal and linear movements of said stylus member;

a first control assembly mounted on said housing and including a first reciprocally movable control member movable along an axis traversing the axis of said spindle and engaging said first cam member in cam follower relationship therewith to be displaced thereby in a particular direction along the transverse axis as said spindle is moved in each of said two directions with respect to said null position, said first control assembly comprising an hydraulic control valve including first resilient means biasing said first control member against the surface of said first cam member;

a second control assembly mounted on said housing and including a second reciprocally movable control member movable along an axis traversing the axis of said spindle and engaging said second cam member in cam follower relationship therewith to be displaced thereby along the last-named transverse axis in one direction for movements of said spindle in one of said two directions and in a second direction for movements of said spindle in the other of said two directions, said second control assembly comprising an hydraulic control valve including second resilient means biasing said second control member against the surface of said second cam member; and third resilient means in said housing engaging said spindle and resiliently biasing said spindle in an axial direction towards one end of said housing.

2. A tracer control mechanism including:

a housing;

a spindle mounted in said housing for axial longitudinal reciprocal linear movement therein and for rotatable movement therein;

first and second cam members positioned on said spindle axially spaced from one another;

a stylus member mounted in said housing for pivotal and longitudinal reciprocal linear movement therein;

means coupling said stylus member to said spindle for producing linear movements of said spindle in each of two directions with respect to a predetermined null axial position in response to pivotal and linear movements of said stylus member;

a first control assembly mounted on said housing and including a first reciprocally movable control member engaging said first cam member in cam follower relationship therewith to be displaced thereby in a particular direction as said spindle is moved in each of said two directions with respect to said null position, said first cam member being shaped to displace said first control member to different operative positions upon rotation of said spindle when said spindle is in said predetermined null axial position with respect to said housing; and a second control assembly mounted on said housing and including a second reciprocally movable control member engaging said second cam member in cam follower relationship therewith to be displaced thereby in one direction for movements of said spindle in one of said two directions and to be displaced in a second direction for movements of said spindle in the other of said two directions.

3. The combination defined in claim 2, in which said first cam surface is shaped to provide a displacement of said first control member upon axial movement of said spindle from said null axial position to a second predetermined axial position with respect to said housing dependent on the angular position of said spindle.

4. A tracer control mechanism including:
a housing;
a spindle mounted in said housing for axial longitudinal reciprocal linear movement therein and for rotatable movement therein;
first and second cam members positioned on said spindle axially spaced from one another;
a stylus member mounted in said housing for pivotal and longitudinal reciprocal linear movement therein;
means coupling said stylus member to said spindle for producing linear movements of said spindle in each of two directions with respect to a predetermined null axial position in response to pivotal and linear movements of said stylus member;
a first control assembly mounted on said housing and including a first reciprocally movable control member engaging said first cam member in cam follower relationship therewith to be displaced thereby in a particular direction as said spindle is moved in each of said two directions with respect to said null position; and
a second control assembly mounted on said housing and including a second reciprocally movable control member engaging said second cam member in cam follower relationship therewith to be displaced thereby in one direction for movements of said spindle in one of said two directions and to be displaced in a second direction for movements of said spindle in the other of said two directions, said second cam member being shaped to provide different predetermined displacements of said second control member, as determined by the angular setting of said spindle, as said spindle is moved from said null axial position to a second predetermined axial position in said housing.

5. The combination defined in claim 4, in which said second cam member is shaped to establish a particular setting of said second control member when said spindle is in said predetermined null axial position and independent of the angular setting of said spindle.

6. A tracer control mechanism including:
a housing;
a spindle mounted in said housing for axial longitudinal reciprocal linear movement therein and for rotatable movement therein;
first and second cam members positioned on said spindle axially spaced from one another;
a stylus member mounted in said housing for pivotal longitudinal reciprocal linear movement therein;
means coupling said stylus member to said spindle for producing linear movements of said spindle in each of two directions with respect to a predetermined null axial position in response to pivotal and linear movements of said stylus member;
a first control assembly mounted on said housing and including a first reciprocally movable control member engaging said first cam member in cam follower relationship therewith to be displaced thereby in a particular direction as said spindle is moved in each of said two directions with respect to said null position, said first cam member being shaped to displace said first control member to different operative positions upon rotation of said spindle when said spindle is in said predetermined null axial position with respect to said housing; and
a second control assembly mounted on said housing and including a second reciprocally movable control member engaging said second cam member in cam follower relationship therewith to be displaced thereby in one direction for movements of said spindle in one of said two directions and to be displaced in a second direction for movements of said spindle in the other of said two directions, said second cam member being shaped to provide different predetermined displacements of said second control member, as determined by the angular setting of said spindle, as said spindle is moved from said null axial position to a second predetermined axial position in said housing.

7. The combination defined in claim 6, in which said first cam surface is shaped to provide a displacement of said first control member to a null position upon axial movement of said spindle from said null position to a second predetermined axial position with respect to said housing and independent of the angular position of said spindle; and in which said second cam member is shaped to establish a particular setting of said second control member when said spindle is in said null axial position and independent of the angular setting of said spindle.